(12) United States Patent
Herz

(10) Patent No.: US 7,876,996 B1
(45) Date of Patent: Jan. 25, 2011

(54) METHOD AND SYSTEM FOR TIME-SHIFTING VIDEO

(75) Inventor: William Samuel Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1110 days.

(21) Appl. No.: 11/304,531

(22) Filed: Dec. 15, 2005

(51) Int. Cl.
  H04N 5/91 (2006.01)
  H04N 7/16 (2006.01)
  H04N 7/025 (2006.01)
  H04N 7/173 (2006.01)

(52) U.S. Cl. .............................. 386/46; 725/34; 725/90; 725/136

(58) Field of Classification Search .................... 386/46, 386/E5.002; 348/E7.054; 375/E7.024; 725/34, 725/90, 136
See application file for complete search history.

(56) References Cited

U.S. PATENT DOCUMENTS

| 5,136,559 | A | 8/1992 | Nakayama |
| 5,305,307 | A | 4/1994 | Chu |
| 5,561,668 | A | 10/1996 | Genter |
| 5,568,558 | A | 10/1996 | Ramm et al. |
| 5,911,124 | A | 6/1999 | Doran |
| 6,091,813 | A | 7/2000 | Harley et al. |
| 6,181,753 | B1 | 1/2001 | Takada et al. |
| 2003/0040903 | A1 | 2/2003 | Gerson |
| 2003/0105637 | A1 | 6/2003 | Rodriguez et al. |
| 2005/0008143 | A1 | 1/2005 | Lang et al. |
| 2005/0086058 | A1 | 4/2005 | Lemelson et al. |
| 2005/0114141 | A1 | 5/2005 | Grody |
| 2006/0271980 | A1* | 11/2006 | Mankovitz ................... 725/90 |
| 2007/0116254 | A1 | 5/2007 | Looney et al. |
| 2008/0201138 | A1 | 8/2008 | Visser et al. |

OTHER PUBLICATIONS

Herbordtt, W.; Nakamura, S.; Kellermann, W., "Joint Optimization of LCMV Beamforming and Acoustic Echo Cancellation For Automatic Speech Recognition," Acoustics, Speech, and Signal Processing, 2005. Proceedings. (ICASSP '05). IEEE International Conference on, vol. 3, no., pp. iii/77-iii/80 vol. 3, Mar. 18-23, 2005.

(Continued)

Primary Examiner—Thai Tran
Assistant Examiner—Syed Y Hasan

(57) ABSTRACT

A method and system for time-shifting video. Specifically, in the method a digital input video signal is received at a processor unit, such as a video processor unit (VPU). A live feed of the digital input video signal is provided as a digital output video signal for display. In parallel, the digital input video signal is stored as video frames. Also, the digital input video signal is recorded for time-shifting. An instruction is received to display a previously seen frame of the digital output video signal. The previously seen frame is repeatedly accessed and provided from that the stored video frames. The previously seen frame that was recorded is accessed when available. Thereafter, the method switches from the previously seen frame stored as video frames to the previously seen frame that was recorded for providing as an output for display.

19 Claims, 7 Drawing Sheets

OTHER PUBLICATIONS

Harrison, W.; Jae Lim; Singer, E., "A new application of adaptive noise cancellation," Acoustics, Speech and Signal Processing, IEEE Transactions on, vol. 34, No. 1 pp. 21-27, Feb. 1986.

Miksic, Andrej / Horvat Bogomir (1997): "Subband echo cancellation in automatic speech dialog systems", In EUROSPEECH 1997, 2579-2582.

W. Herbordt and W. Kellermann, "Frequency-domain integration of acoustic echo cancellation and a generalized sidelobe canceller with improved robustness", European Trans. On Telecommunications, vol. 13, No. 2, pp. 123-132, 2002.

* cited by examiner

200

700A

700B

700C

700D

700E

METHOD AND SYSTEM FOR TIME-SHIFTING VIDEO

FIELD OF THE INVENTION

Embodiments of the present invention relate to personal video recorders. More specifically, embodiments of the present invention relate to a method and system for time-shifting video in a PVR.

BACKGROUND ART

A personal video recorder (PVR) is able to record video in a digital form and replay the stored video. That is, the PVR is able to time-shift video so that video that is recorded can be replayed at a later time. In the conventional art, the input video is heavily processed during the recording process. Specifically, the recorded video is digitized, television decoded, compressed, decompressed, television encoded, and converted back to an analog signal for display. Each of these processing steps is required when time-shifting video.

However, additional time is required for each of the processing steps when recording video. As such, the processed and recorded video lags behind the available live video feed. In addition, each of the processing steps also degrade the video. That is, the recorded video is of a quality that is of a lower quality than the input video signal.

As a result, one of the disadvantages of the conventional technique is that when a user pauses live video, the heavily processed, time-shifted video is used for displaying the paused video. Alternatively, if the live input video is displayed for live pause, there is an inherent latency in the conventional art when switching from live video to displaying a corresponding time-shifted frame that was previously recorded. That is, from the time that the live video is paused at a paused frame there would be a delay of several seconds before the paused frame is available for display from the time-shifted, recorded video. As such, a user would experience pushing a pause button at a paused frame, watching live video that is not paused for several seconds, and then switching the displayed video back to the paused frame, which is back in time from the live video. The paused frame that is displayed is obtained from the time-shifted, recorded video.

Additionally, when the user wants to switch back to live video, thereby bypassing the video processing for recording the video, there is a several second gap between the last, time-shifted frame that is displayed and the first, live video frame that is displayed. This creates a discontinuity for the user when shifting back from a paused frame back to a live frame.

SUMMARY OF THE INVENTION

Accordingly, the present invention provides, in various embodiments, a method and system for time-shifting video in a personal-video-recorder. Embodiments of the present invention provide for reduced latency when pausing video. Additionally, embodiments of the present invention provide for higher quality video when time-shifting due to less processing. Also, embodiments of the present invention provide for a graceful transition when switching between paused video and returning back to live video.

Specifically, in one embodiment, a method is disclosed for time-shifting video. The method begins by receiving a digital input video signal at a video processor unit (VPU). The digital input video signal is transparently processed through the VPU to generate a digital output video signal formatted for display. That is, when performing in a pass-through mode rather than a compress/decompress mode, the signal is processed transparently for a higher quality signal. In parallel, the digital output video signal is recorded (e.g., processed and compressed) for time-shifting. An instruction is received to pause the digital output video signal at a paused frame. The paused frame is repeatedly accessed from a frame buffer that stores the digital input video signal. The live, paused frame from the frame buffer is provided as an output for display. That is, the most current frame is transferred to the frame buffer without performing compression or decompression and available for repeated display. The paused frame that was recorded (e.g., processed and compressed) is accessed when available. Thereafter, the present embodiment switches from the paused frame obtained from the frame buffer to the paused frame that was recorded as an output for display.

In another embodiment, a method is disclosed for time-shifting video in a PVR that provides for a graceful transition back to live video. Specifically, the present embodiment begins by processing a digital input video signal that was originally received as an analog input video signal. The digital input video signal is processed through a VPU to generate a digital output video signal formatted for display. The digital input video signal is also stored in a frame buffer. In parallel, the digital input video signal is recorded for time-shifting. Thereafter, when performing a live pausing function, the present embodiment initially sends a paused frame from the frame buffer, and then sends the paused frame that is time-shifted (e.g., processed, compressed, and decompressed) when it is available for display. Simultaneously, while the paused frame is outputted and displayed, the present embodiment also sends a live feed of the digital input video signal for display in a window that shows live content. Thereafter, after receiving an instruction to resume live play of the digital input video signal, the present embodiment gradually expands the size of the window to fill the full frame of the display with the live video. That is, the VPU is used for performing transitioning, for scaling, for non-linear scaling, dual channel scaling, etc.

In still another embodiment, a personal video recorder (PVR) is disclosed that is capable of time-shifting video. The PVR includes a VPU for generating a digital output video signal formatted for display from a digital input video signal. The PVR also includes a frame buffer for storing the digital output video signal. The frame buffer outputs a paused frame for display when receiving an instruction to pause the digital output signal at the paused frame. Additionally, the PVR includes a compression engine for storing the digital output video signal for purposes of time-shifting. The compression engine comprises a Moving Picture Experts Group (MPEG) encoder, TV decoder, content manager, hard disk drive controller, etc. In addition, the PVR comprises a decompression engine, TV encoder, scalar, etc. that is capable of outputting the paused frame that is time-shifted for display when available. The PVR also includes a video selector for switching between the paused frame obtained from the frame buffer and the paused frame that is processed, compressed, and decompressed as an output for display.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
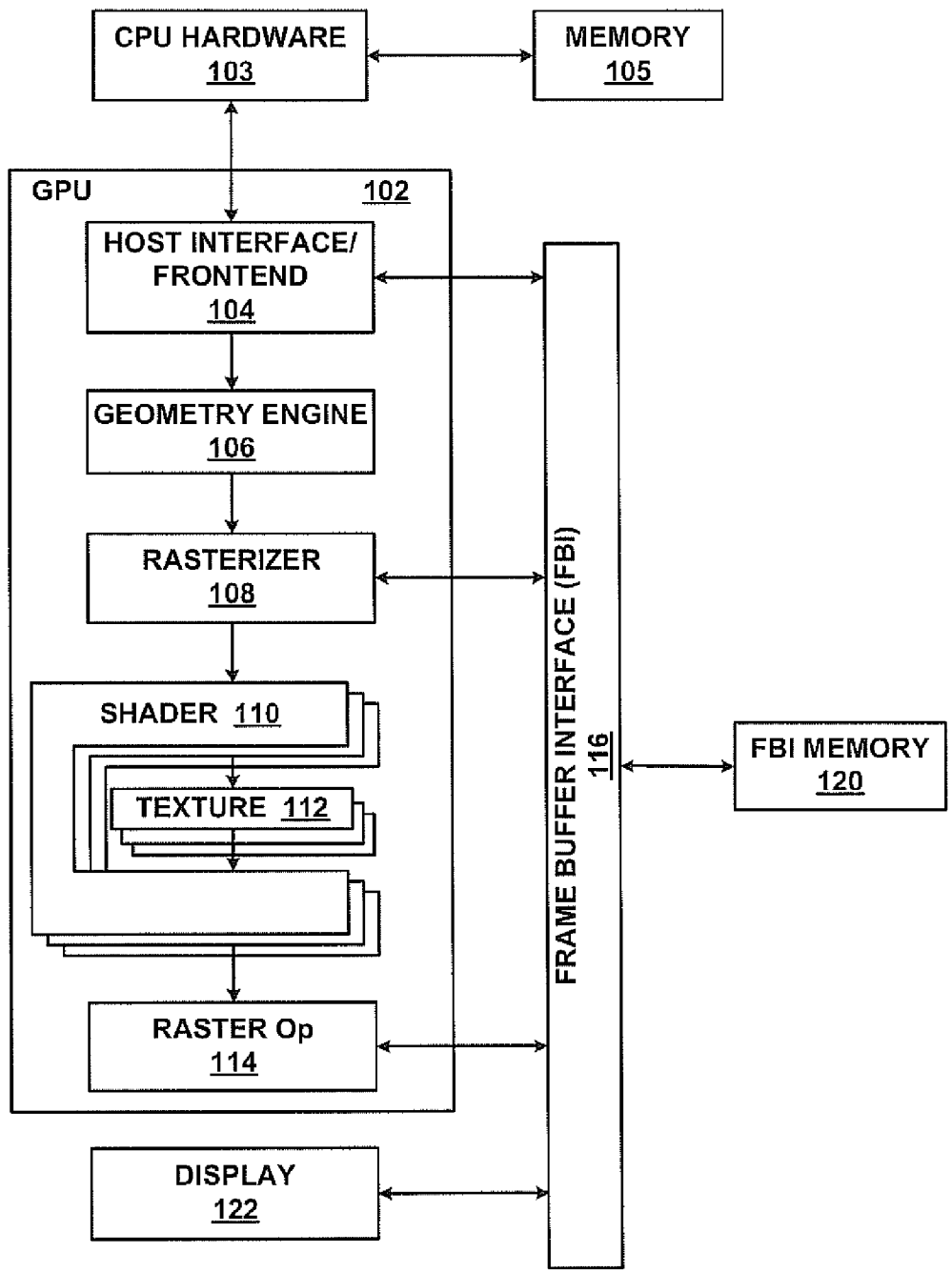
FIG. 1 shows a diagram depicting the various stages of an exemplary graphics processor unit pipeline, in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

In general, embodiments of the present invention are capable of providing time-shifting (e.g., processed, compressed, and decompressed) of video through a video processing unit (VPU). Other embodiments provide time-shifting of video through a graphics processing unit (GPU), where the GPU includes a 3-D graphics pipeline. In still another embodiment, the VPU is associated with a GPU, such that the GPU includes the VPU. Specifically, the present invention provides for reduced latency when pausing video. Additionally, embodiments of the present invention provide for higher quality video when time-shifting due to transparent processing. Also, embodiments of the present invention provide for a graceful transition when switching between paused video and returning back to live video. Embodiments of the present invention and their benefits are further described below.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," or "processing," or "recording," or "accessing," or "switching," or the like, refer to the action and processes of a computer system (e.g., computer system 200 of FIG. 2), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are implemented within a stand-alone VPU. That is, the VPU is capable of providing time-shifting of video. Other embodiments are well suited to providing time-shifting of video through a GPU including a VPU that is capable of providing time-shifting of video. Still other embodiments are well suited to providing time-shifting of video within a stand-alone, integrated, or CPU based GPU, and a digital media processor, CPUs, etc.

Video and graphics processing are important features of modern high performance computing systems. In both video and graphics processing, digital video-out signals provide high-quality personal computer (PC) video or graphics display output.

In other embodiments, GPUs are capable of time-shifting video. GPUs are specialized integrated circuit devices that are commonly used in graphics systems to accelerate the performance of a 3-D rendering application. GPUs are commonly used in conjunction with a central processing unit (CPU) to generate three-dimensional images for one or more applications executing on a computer system. Modern GPUs typically utilize a graphics pipeline for processing data.

In graphics processing, mathematical procedures are implemented to render, or draw, graphic primitives, e.g., a triangle or a rectangle, on a display to produce desired visual images. The rendering of three-dimensional graphical images is of interest in a variety of television video display, electronic games, and other applications. Rendering is the general term that describes the overall multi-step process of transitioning from a database representation of a three-dimensional object to a two-dimensional projection of the object onto a viewing surface, e.g., computer display, television set.

FIG. 1 illustrates a simplified block diagram of an exemplary graphics system 100 that includes a graphics processing unit 102. As shown, the graphics processing unit 102 has a host interface/front end 104 that receives raw graphics data from central processing hardware 103 that is executing an application program stored in memory 105. The host interface/front end 104 buffers input information and supplies that information to a geometry engine 106 that outputs 2 dimensional frame buffer coordinates.

The 2 dimensional co-ordinates of the vertices of the graphics primitives are supplied to a rasterizer 108 to determine the positions of all of the pixels within the graphics primitives as rasterized pixel data. The rasterized pixel data are applied to a shader 110 that adds texture, color, and optical features related to fog and illumination to the rasterized pixel data to produce shaded pixel data. The shader 110 includes a texture engine 112 that modifies the rasterized pixel data to have desired texture and optical features. The shaded pixel data is input to a Raster Operations Processor 114 that performs color blending on the shaded pixel data. The result from the Raster Operations Processor 114 is frame pixel data that is stored in a frame buffer memory 120 by a frame buffer interface 116. The frame pixel data can be used for various processes such as being displayed on a display 122. Frame pixel data can be made available as required by way of the frame buffer interface 116.

Figure 2:
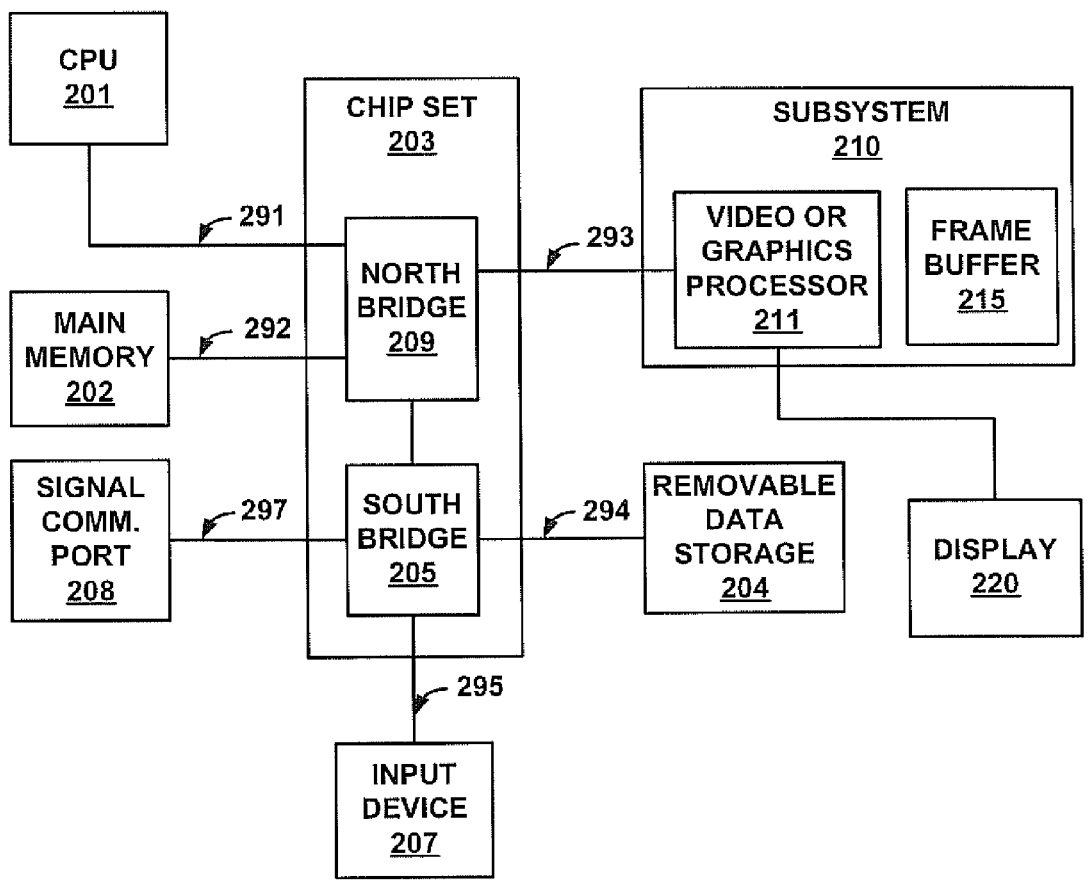
FIG. 2 is a block diagram of a computer system in which embodiments of the present invention can be implemented, in accordance with one embodiment of the present invention.

Computer System Platform:

With reference now to FIG. 2, a block diagram of an exemplary computer system 200 is shown upon which embodiments of the present invention can be implemented, in accordance with one embodiment of the present invention. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220.

Computer system 200 includes several buses for communicatively coupling the components of computer system 200. Communication bus 291 (e.g., a front side bus) couples north bridge 209 of chipset 203 to central processor unit 201. Communication bus 293 (e.g., PCI Express, PCI, Advanced Graphics Port (AGP) interface, etc.) couples north bridge of chipset 203 to video or graphics subsystem 210. Communication buses 294-297 (e.g., PCI bus) couple south bridge 205 of chip set 203 to removable data storage device 204, input device 207, signal communications port 208, respectively. In addition, the main memory 202 is coupled to the north bridge 209 via a point to point connection 292 between the memory controller on the north bridge 209 and the dynamic random access memory (DRAM).

The components of computer system 200 cooperatively operate to provide versatile functionality and performance. The operating characteristics of functional components included in computer system 200 can change dynamically. In one exemplary implementation, the components of computer system 200 cooperatively operate to provide predetermined types of functionality, even though some of the functional components included in computer system 200 may be defective. Communications bus 291, 293, 294, 295 and 297 communicate information. Central processor 201 processes information. Main memory 202 stores information and instructions for the central processor 201. Removable data storage device 204 also stores information and instructions (e.g., functioning as a large information reservoir). Input device 207 provides a mechanism for inputting information and/or for pointing to or highlighting information on display 220. Signal communication port 208 provides a communication interface to exterior devices (e.g., an interface with a network). Display device 220 displays information in accordance with data stored in frame buffer 215. Video or graphics processor 211 processes video or graphics commands from central processor 201 and provides the resulting data to frame buffers 215 for storage and retrieval by display monitor 220.

The operational configurations of the functional components included in computer system 200 are flexibly adaptable to meet a variety of objectives. For example, operational configurations of the functional components included in computer system 200 are configurable to maintain execution of a type of function even if some of the video processor functional components are disabled. In one exemplary implementation, central processor 201 and graphics processor 211 are still capable of executing the same type of processing functions and main memory 202 stores information even though some of the functional components (e.g., floating point component, pixel shader component, memory cell component, etc) are disabled. In one embodiment, the processors include a plurality of functional components for performing processing operations. The operational characteristics of the functional components can be altered. In one embodiment, the processors include a plurality of functional components for performing processing operations, wherein defective functional components included in the plurality of functional components are disabled. The processors also include a workflow control component for dispensing workflow to enabled processing components and preventing distribution of workflow to the disabled defective components. In one exemplary implementation, computer system 200 can continue to provide full functionality even though the functionality may be provided at a reduced performance level (e.g., slower).

Figure 3:
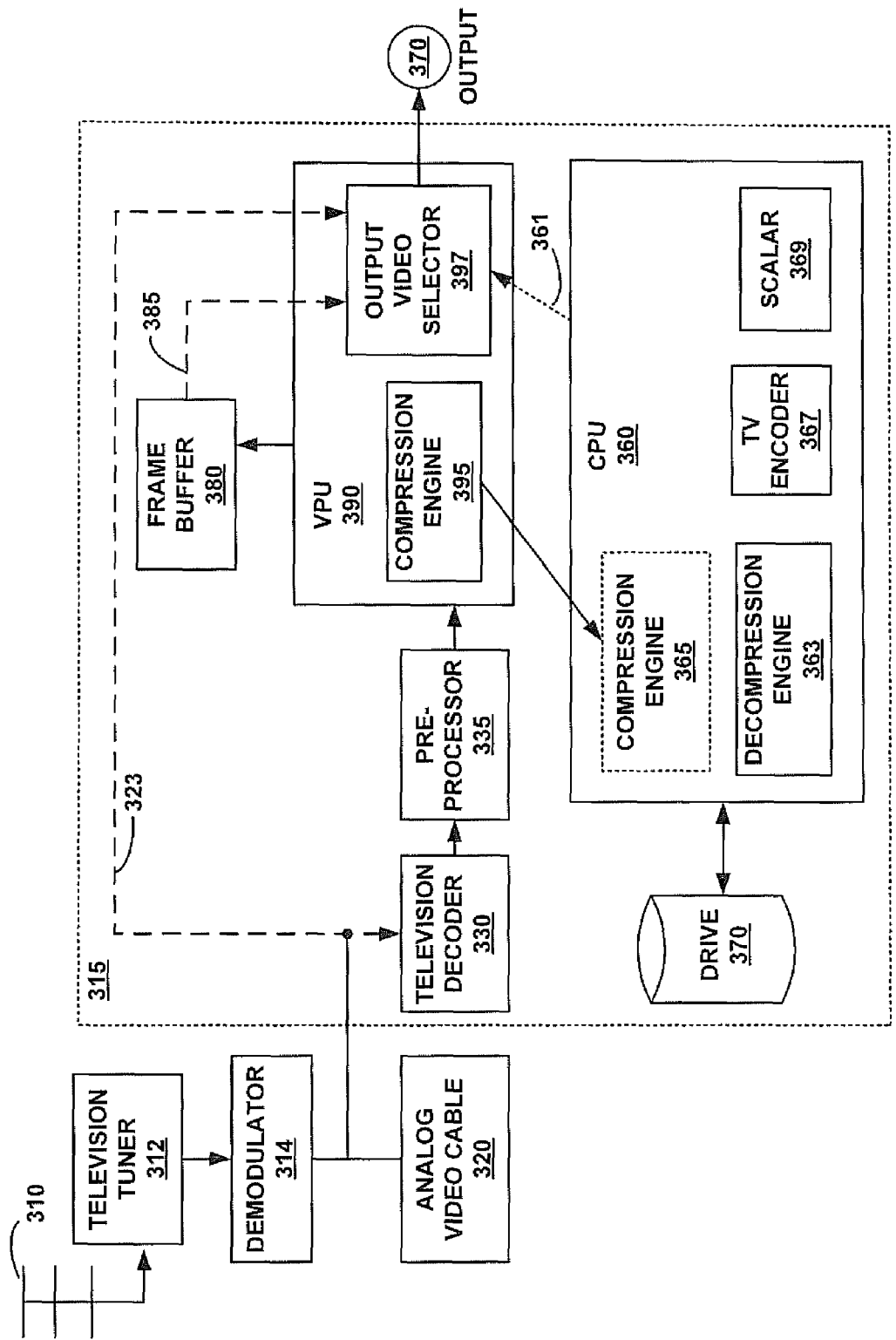
FIG. 3 is a block diagram illustrating a system that is capable of time-shifting video in a personal video recorder, in accordance with one embodiment of the present invention.

Method and System for Time-Shifting Video in a Personal Video Recorder:

FIG. 3 is a block diagram of a system 300 that is capable of time-shifting video through the use of a VPU 390 in a PVR 315, in accordance with one embodiment of the present invention. Other embodiments are well suited to a system that is capable of time-shifting video through the use of a GPU in a PVR 315. That is, the VPU 390 is replaced with a standalone GPU, in one embodiment, or a GPU including a VPU, in another embodiment.

The present embodiment is capable of recording video that is processed, compressed, and decompressed for purposes of time-shifting video frames in parallel with a live video feed. As such, the present embodiment provides for reduced latency when pausing video. Additionally, embodiments of the present invention provide for higher quality video when time-shifting due to less processing.

As shown in FIG. 3, an analog input television signal is received by the system 300 through various means. In one embodiment, the analog input television signal is received through an antenna 310, a television tuner 312 for picking up the correct frequency, and a demodulator 314 for separating the video signal from a carrier wave. In another embodiment, the analog input television signal is received through a video cable network 320.

In FIG. 3, the analog input television signal is received by the television decoder 330. The television decoder 330 is used to digitize the analog input television signal for processing through the remaining components of the system 300. The television decoder outputs a digital input video signal (e.g., YCrCb). Additionally, the digital input video signal may be further processed in the pre-processor 335 before being sent to the VPU 390.

The system 300 includes a PVR 315 that is capable of time-shifting video (e.g., processed, compressed, and decompressed). As shown in FIG. 3, the PVR includes, in part, the television decoder 330, the frame buffer 380, the VPU 390, the CPU 360, and the memory or drive 370.

In one embodiment, the PVR 315 sends the live feed of the video input signal to the output video selector 397. As such, the PVR is able to generate an output video signal without any processing by directly outputting the live feed of the video input signal. This produces a high quality signal for display.

In another embodiment, for high quality previewing of the input signal, the digital input video signal is outputted from the television decoder 330, through the optional preprocessor 335, and sent to the VPU 390 through the PVR. In one embodiment, the VPU 390 receives the digital input video signal through a video input port (VIP).

The digital input video signal is then processed by the VPU 390 to generate a digital output video signal formatted for display. For example, the digital video signal is formatted as a television (TV) signal, a video graphics adapter (VGA) out signal, a digital visual interface (DVI) signal, a transition minimized differential signaling (TMDS) signal, a high definition multimedia interface (HDMI) signal, etc.

In addition, the digital input video signal can be converted through a TV encoder (367) to generate an analog television signal. As such, the analog television signal can be displayed on a television set formatted for analog television signals.

Specifically, the VPU 390 sends the digital input video signal to the frame buffer 380 without any further processing (e.g., without compression). That is, the video frames stored in the frame buffer is of high quality. The frame buffer 380 stores the uncompressed digital input video frames. For example, the frame buffer 380 is analogous to the frame buffer 215 of FIG. 2. The uncompressed digital input video frames stored in the frame buffer 380 are then retrieved by the VPU 390 through the output video selector 397. The output video selector 397 outputs the digital output video signal through the output port 340 for display.

The frame buffer 380 is capable of outputting any frame that is stored. For instance, the frame buffer is capable of outputting a live, paused frame for display when receiving an instruction to pause a display of the digital output signal at the paused frame, in one embodiment. The live, paused frame is sent from the frame buffer 380 to the output video selector 397 over path 385. An illustration of this process is described more fully below in the discussion related to FIG. 5.

In addition, the PVR 315 of the system 300 is capable of storing the digital input video signal in a more permanent format. That is, the PVR 315 is capable of recording the digital input video signal in a compressed format. More specifically, the PVR 315 in parallel with sending the digital output video signal as a live feed, from path 323, to the output port 340 for display, or sending the digital input video signal to a frame buffer for providing live pausing, also records the digital input video signal by using the VPU 390 in combination with the CPU 360. The CPU 360 is analogous to the CPU 201 of FIG. 2. As such, the PVR 315 includes a compression engine for storing the digital input video signal in a compressed form for purposes of time-shifting. In general, time-shifting allows previously recorded video frames to be displayed at a later moment in time.

In one embodiment, the compression engine performs motion estimation, discrete cosine transform, quantization, motion compensation, etc. For example, the compression engine compresses the digital input video signal using an MPEG standard. This MPEG compressed video is then stored on a disk for later retrieval, as in time-shifting.

In one embodiment, compression of the digital input video signal is performed by the compression engine 395 located in the VPU 390. That is the VPU 390 is able to also compress the digital input video signal for storage. In another embodiment, compression of the digital input video signal is performed by the optional, compression engine 365 located in the CPU 360. In still another embodiment, compression of the digital input video signal is performed by both the compression engine 395 and the compression engine 365, in combination.

After the digital input video signal is compressed, the CPU 360 sends the compressed signal to the drive 370 for storage. The drive 370 is analogous to the data storage 204 of FIG. 2, and as such, the CPU 360 sends the compressed signal over a bus (e.g., PCI, PCI-Express, etc.) through the south bridge to the drive 370, in one embodiment.

In other embodiments, the VPU 390 is coupled to the CPU through an accelerated graphics port (AGP) bus, or a PCI bus, or a PCI-Express bus, etc.

The PVR 315 is also able to generate a video signal suitable for display from the compressed digital input signal stored in the drive 370. That is, the decompression engine 363 performs decompression of the digital input signal stored in the drive 370. The function of the decompression engine 363 is associated with the CPU 360, in one embodiment. In another embodiment, the function of the decompression engine 363 is associated with the VPU 390.

Additionally, the CPU 360 is able to generate an analog television signal from the digital video input signal that is stored, compressed in the drive 370, and decompressed in the decompression engine 363, in accordance with one embodiment. This analog TV signal can be sent to the output video selector for outputting as an output signal at port 340. In another embodiment, the functions of the encoder 367 are associated with the VPU 390.

Also, the CPU 360 is able scale a digital output video signal for display through a scalar 369. That is, the scalar 369 is able to provide a video signal scaled to the display window, and to provide graceful transitioning of the window when changing sizes of the window to grow smaller in or grow larger to fill a corresponding display.

In the present embodiment, the VPU 390 is able to display a paused frame by accessing the live, paused frame that is uncompressed from the frame buffer 380, or accessing the paused frame that has been compressed, stored on the drive 370, and decompressed through the CPU 360. More specifically, an output video selector 397 in the VPU 390 is able to switch between accessing the live, paused frame that is not compressed from the frame buffer 380 or the paused frame that is stored in the drive 370 and decompressed by the CPU 360 for display. That is, the video selector 397 selects the signal that is sent through the output node 340.

In one embodiment, to reduce latency, the video selector 397 is able to access the live, paused frame directly from the frame buffer 380. In this manner, the paused frame outputted for display is of high quality since it has not been compressed or processed. This paused frame for the frame buffer 380 is repeated. That is, the read pointer range for the frame buffer 380 remains the same. Also, the frame buffer 380 does not rewrite that location (e.g., the write pointer to the frame buffer 380 is turned off) so that the paused frame can be continually outputted for display.

After a predictable delay associated with the time needed to process the digital output video signal by the VPU 390 in combination with the CPU 360 and to decompress the video frame that matches the paused frame that was selected for pausing, the output path switches. That is, video selector 397 switches from the paused frame obtained from the frame buffer 380 to the paused frame that was compressed and stored in the drive 370. Specifically, instead of outputting the paused frame (e.g., repeated frame buffer read address), the new path outputs the decompressed and time-shifted video through the VPU's decompression path (e.g., motion compensation and inverse discrete cosine transform [IDCT]). As a result, when the user plays the decompressed video, the next frame displayed is the next frame following the compressed, paused frame.

Figure 4:
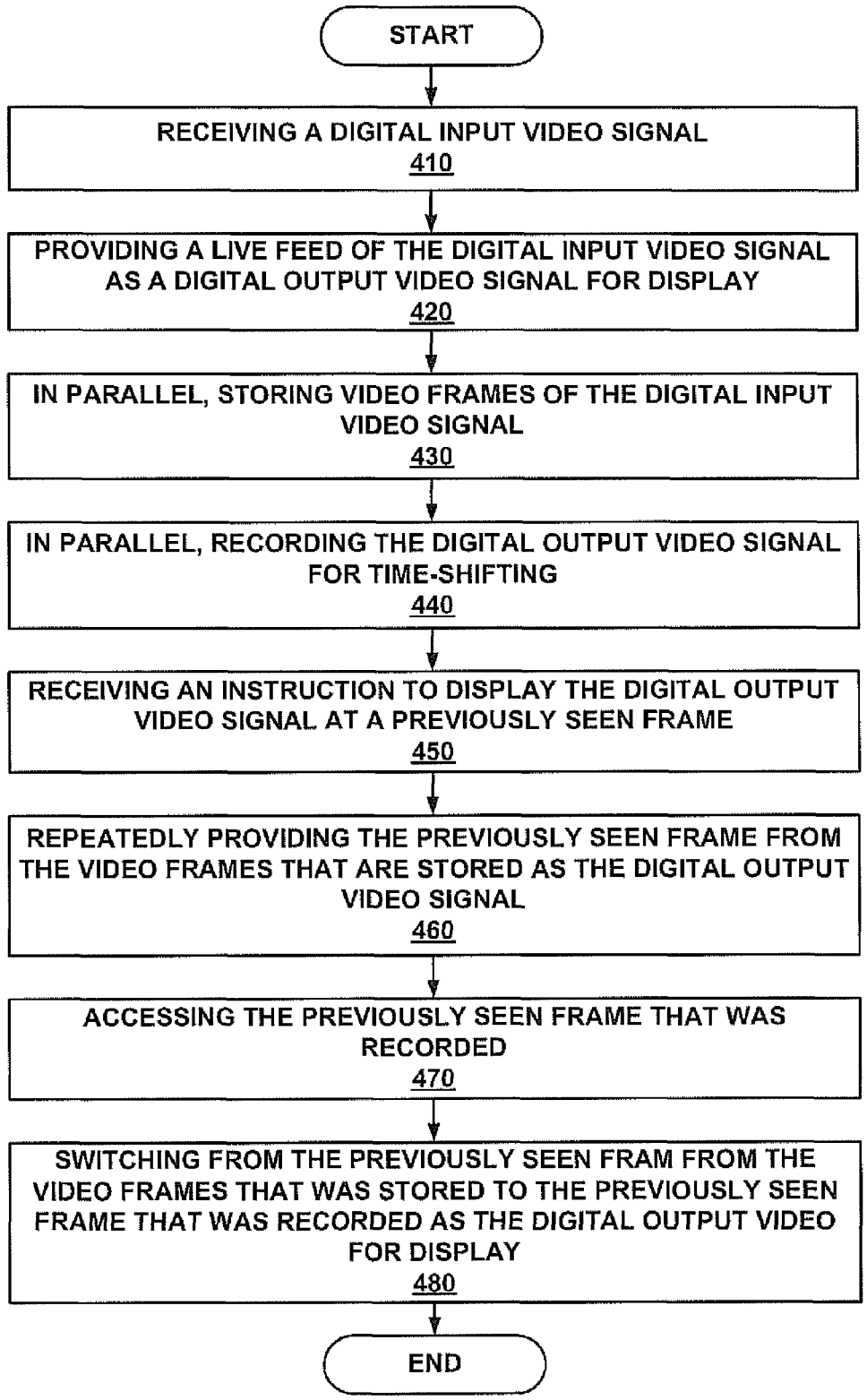
FIG. 4 is a flow chart illustrating steps in a computer implemented method for time-shifting in a PVR, in accordance with one embodiment of the present invention.

FIG. 4 is a flow chart illustrating steps in a computer implemented method for time-shifting video in a PVR, in accordance with one embodiment of the present invention. The embodiment of FIG. 4 is implemented by the PVR of the system 300 of FIG. 3 in one embodiment.

At 410, the present embodiment receives a digital input video signal. For instance, the digital input video signal is received at a PVR. In one embodiment, the PVR comprises a VPU. In another embodiment, the PVR comprises a GPU. In still another embodiment, the PVR comprises a GPU that includes a VPU.

In one embodiment, the digital input video signal originated as an analog input video signal. That is, prior to receiving the digital input video signal, the present embodiment receives an analog input video signal. For instance, the analog input video signal is a live feed transmitted through the air, or over a cable line, etc. The analog input video signal is converted to the digital input video signal. In another embodiment, the digital input video signal originated as a digital input signal. The present embodiment then sends the digital input video signal to the processor unit (e.g., VPU).

At 420, the present embodiment provides a live feed of the digital input video signal as a digital video frame that is uncompressed. This digital output video signal is formatted for display, as described previously. For example, the digital output video signal can be formatted as a TV out signal, VGA out signal, DVI out signal, TMDS out signal, HDMI out signal, etc.

At 430, video frames of the digital input video signal are stored. That is, for example, video frames are stored in a frame buffer.

At 440, the digital input video signal is recorded for purposes of time-shifting. More specifically, in parallel to the displaying of the uncompressed digital video output signal, the present embodiment is able to compress the digital input video signal and store the compressed signal for later access and retrieval. The compressed video is capable of being displayed after decompression (e.g., motion compensation and IDCT). Display of the compressed video is time-shifted.

At 450, the present embodiment receives an instruction to display a previously seen frame. For instance, the previously seen frame is the live frame currently displayed. In another case, the previously seen frame was displayed at a previous time, as in the case of rewinding, or skipping to a previously seen frame.

In one embodiment, the instruction is provided to pause the live feed at a current frame, a live, paused frame. In another embodiment, the instruction is provided to rewind the live feed to the previously seen frame. This is accomplished through the display of video frames from the frame buffer, or through the compressed and stored digital input video signal. In still another embodiment, the instruction is provided to skip to the previously seen frame.

In one embodiment, the display processing is performed. For example, de-interlacing, edge enhancement, block removal, MPEG artifact removal, etc. of the digital output video signal. In one embodiment, this is performed by the GPU, VPU, or CPU, or a combination thereof.

At 460, the present embodiment repeatedly provides the previously seen frame from the video frames that are stored, as the digital output video signal. For example, the present embodiment repeatedly accesses the paused frame from the frame buffer that temporarily stores the digital output video signal. Specifically, the previously seen frame in the frame buffer is repeated. As such, the read pointer in the frame buffer remains the same, but the write pointer is turned off. For instance, when a user pauses at a current live, frame, the digital output video signal displays a paused frame that is repeatedly accessed from a frame buffer.

Because the present embodiment sends the previously seen frame obtained from the frame buffer for display, the any latency is avoided in displaying the previously seen frame. That is, the paused frame from the frame buffer can be immediately displayed, as will be described more fully in relation to FIG. 5. The previously seen frame is repeatedly accessed from the frame buffer and sent for display.

At 470, the present embodiment accesses the previously seen frame that was recorded. That is, the present embodiment accesses from storage the exact frame corresponding to the previously seen frame. This compressed representation of the previously seen frame is decompressed and provided for display.

At 480, the present embodiment switches the signal outputted for display from the previously seen frame obtained from the frame buffer as stored video frames to the recorded, previously seen frame that is decompressed. In one embodiment, the switching is performed at a vertical sync blanking interval to avoid any video/visual glitches.

In another embodiment, a second instruction is received to resume play of the digital input video signal. That is, while the previously seen frame is being displayed, the second instruction is received to play the next frame in the video sequence that follows the previously seen frame. As such, the present embodiment accesses the subsequent frames, following the previously seen frame, that are recorded. Specifically, the present embodiment accesses the subsequent frames that are compressed and stored for time-shifting. These subsequent frames are outputted for displaying.

In another embodiment, the second instruction provides for the resumption of the live feed. As such, the present embodiment accesses the live feed from the received digital input video signal, and provides the live feed as the digital output video signal.

In one embodiment, the digital output video signal is displayed in a window showing live content while the previously seen frame is also displayed. In another embodiment, the window of the digital output video signal is gradually expanded for a graceful transition. The generation of the window is provided by the VPU, GPU, or CPU for graceful transitioning.

FIGS. 5A-D are exemplary diagrams illustrating video sequences in a system that is capable of outputting live video and outputting recorded, time-shifted video, in accordance with embodiments of the present invention. The frames shown in each of the FIGS. 5A-D correspond to other frames in each of the other FIGS. 5A-D over time. For example, the first frame in each of the FIGS. 5A-D correspond to time t-1, the second frame in each of the FIGS. 5A-D correspond to time t-2, etc. More specifically, the first frame in FIG. 5A corresponds to the first frame in FIG. 5B, FIG. 5C, and FIG. 5D at a particular moment in time. Correspondingly, the third frame in FIG. 5A corresponds to the third frame in FIG. 5B, FIG. 5C, and FIG. 5D at another particular moment in time.

Figure 5A:
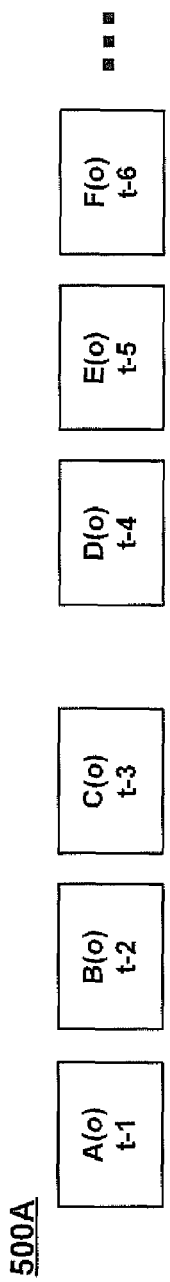
FIG. 5A is a diagram illustrating live video frames as processed by a VPU that are available for display, in accordance with one embodiment of the present invention.

FIG. 5A is a diagram illustrating a video sequence 500A of video frames as processed by a processor unit (e.g., VPU, GPU, etc.) that are formatted for display, in accordance with one embodiment of the present invention. That is, the processor unit continually receives and processes the digital input video signal. The processed video that is generated is the digital input video signal that is formatted for processing. As such, the video sequence 500A shows video frame, A(o), as the output at time t-1. Letter designator A corresponds to the video frame, and the identifier (o) signifies that frame A is an output frame from the digital output video signal. Similarly, at t-2, the video frame, B(o) has been processed. Continuing along the video sequence, video frame C(o) is processed at t-3, D(o) is processed at t-4, E(o) is processed at t-5, F(o) is processed at t-6, etc.

Figure 5B:
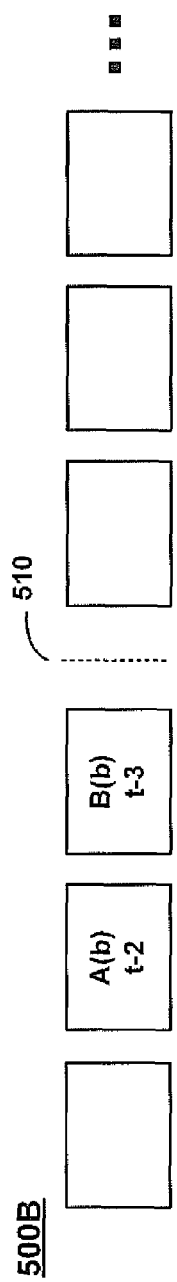
FIG. 5B is a diagram illustrating live video frames as processed by a VPU and stored in a frame buffer, in accordance with one embodiment of the present invention.

FIG. 5B is a diagram illustrating a video sequence 500B of video frames as processed by a processor unit (e.g., VPU, GPU, etc.) and stored in a frame buffer, in accordance with one embodiment of the present invention. The video frames in the frame buffer as shown in the video sequence 500B can be considered the live video available for display. In another embodiment, the live video is associated with the digital input video signal as generated from the processor unit, and can be directly outputted by the processor unit for display without being retrieved from the frame buffer.

As shown in FIG. 5B, at t-1 no video frame is available. That is, the video frame A(o) of FIG. 5A has just been processed and is being written into the frame buffer. As a result, at t-2, the video frame, A(b) has been processed through the processor unit, stored in the frame buffer, and is available for display. Letter designator A corresponds to the video frame, and the identifier (b) corresponds to the frame buffer, such that frame A from the frame buffer is available for display. Similarly, at t-3, the video frame, B(b) has been processed, placed into the frame buffer, and is available for display.

Figure 5C:
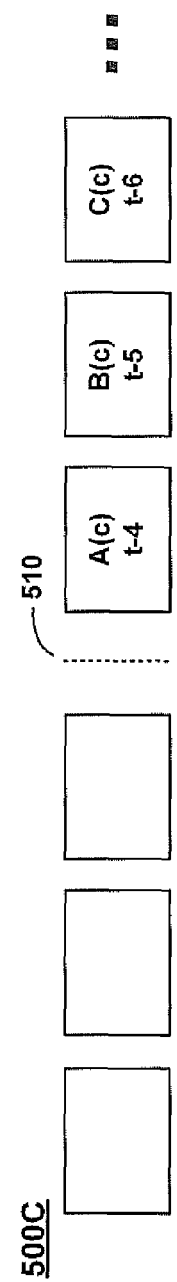
FIG. 5C is a diagram illustrating compressed video frames as processed through a central processing unit (CPU) in a PVR, in accordance with one embodiment of the present invention.

FIG. 5C is a diagram illustrating a video sequence 500C of compressed video frames as processed through a PVR, in accordance with one embodiment of the present invention. As shown in FIG. 5C, there is a latency between the time a video frame in the digital input video signal 500A becomes available and when the corresponding video frame that is compressed becomes available. For example, although video frame A is generated from the VPU at t-1, it is not available for display until t-2 after being stored in the frame buffer. Further, video frame A that is compressed is not available for display until three frames later at time t-4. As such, no compressed video frames are available at t-1 through t-3. That is, the present embodiment compresses the video frame A, then decompresses the video frame A for display, which introduces the latency between the generated video frame A(o), the frame buffer, stored video frame A(b), and the compressed video frame A(c).

As such, at t-4 in the video sequence 500C, the video frame A(c) is available. Letter designator A corresponds to the video frame, and the identifier (c) indicates that the video frame has been compressed. Similarly, at t-5, the video frame, B(c) has been compressed, stored, and available for display after decompression. Continuing along the video sequence, video frame C(c) is processed at t-6, etc. The video sequence 500C closely follows the video sequence 500A. That is, the video frames in the digital input video sequence is continually sent down the compression path for recording and later retrieval, or time-shifting.

Figure 5D:
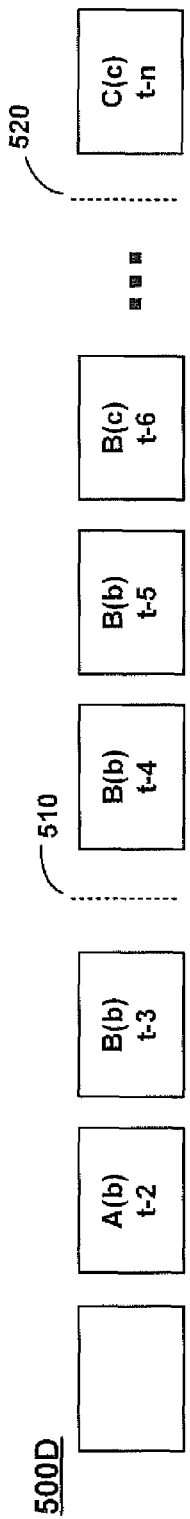
FIG. 5D is a diagram illustrating displayed video frames that are live or paused, in accordance with one embodiment of the present invention.

FIG. 5D is a diagram of a video sequence 500D illustrating displayed video frames that are live or paused, in accordance with one embodiment of the present invention. At time t-1, no video frame is available for display. However, at t-2 video frame A is available from the frame buffer. Basically, this is the live video signal closely corresponding to the digital input video signal of FIG. 5A. As such, the displayed video at t-2 is A(b). similarly, at t-3, the displayed video is B(b).

As shown in FIG. 5B, FIG. 5C, and FIG. 5D, after time t-3, line 510 indicates the time when a paused instruction has been received in the video sequence. Specifically, after B(b) in FIG. 5D has been displayed at t-3, an instruction has been invoked to pause the displayed video sequence at the paused video frame B.

As a result, the present embodiment accesses the paused video frame B from the frame buffer. That is, the read pointer in the frame buffer remains the same. As such, the displayed video at t-4 remains B(b). Also, the write pointer in the frame buffer is turned off. As such, at t-4, t-5, and t-6 no video frames are stored into the frame buffer.

In addition, in one embodiment, the write pointer to the frame buffer is turned back on when returning back to a live feed for the digital video output signal. That is, the write and read pointers are enabled and incremented every frame.

In addition, after a predictable delay associated with the time for the video frame that has been paused to be processed for compression and then subsequently decompressed for display, the present embodiment changes the displayed output. Specially, the paused frame that is compressed finishes processing through the compression engine at t-5 (e.g., B[c)], and is available for display after decompression at t-6. As shown in video sequence 500D, video frame B is displayed at times t-3, t-4, and t-5. At time t-6, the present embodiment then switches and displays the compressed video frame B(c). Thereafter, the compressed video frame B(c) is continually displayed.

In FIG. 5D, line 520 indicates a point in time when an instruction is received to resume play of the paused video sequence. As such, since the displayed video in video sequence 500D is obtained from the recorded video sequence 500C, the next frame displayed is the next frame in the compressed video sequence 500C, C(c) at time t-n. As such, there is no skip introduced in resuming play of the video sequence that is paused. In addition, the paused video sequence and the resumed play of the compressed video sequence is associated with a higher quality, and is more transparent, than the conventional techniques since the present embodiment uses less processing steps for compression, storage, and decompression for display.

Figure 6:
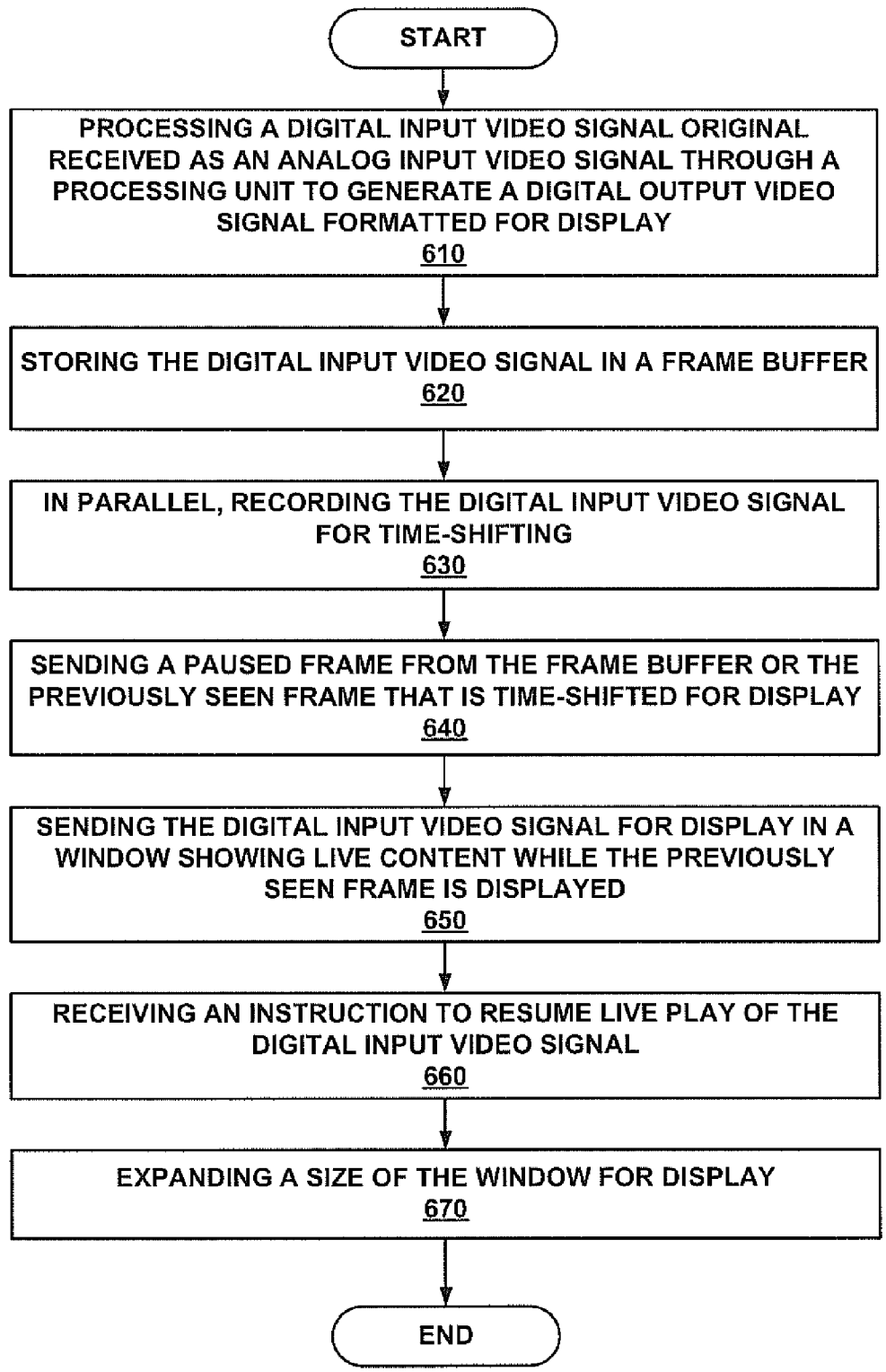
FIG. 6 is a flow chart illustrating steps in a computer implemented method for returning back to live video on a display showing a paused, time-shifted video frame, in accordance with one embodiment of the present invention.

FIG. 6 is a flow chart 600 illustrating steps in a computer implemented method for time-shifting video in a PVR in which a graceful transition between displaying a paused video and returning to live video is achieved, in accordance with one embodiment of the present invention.

At 610, the present embodiment processes a digital input video signal through a processing unit (e.g., VPU, GPU, etc.). In one embodiment, the digital input video signal was originally received as an analog signal. The processor unit through various paths generates a digital output video signal formatted for display. For instance, in one embodiment, the digital input video signal is provided without any further processing as the digital output video signal.

At 620, the present embodiment stores the digital input video signal in a frame buffer. The digital input video signal stored as video frames is accessible by the processor unit (e.g., VPU or GPU) as an output for display. That is, previously seen video frames are accessible for display when pausing, rewinding, or skipping to the previously seen frames.

At 630, in parallel, the present embodiment records the digital input video signal for time-shifting. That is, the present embodiment compresses the digital input video signal using a compression format (e.g., MPEG, H.264, etc.).

At 640, an instruction is received for accessing the video that is displayed at a previously seen frame (e.g., paused, rewound, or skipped). As such, the present embodiment sends the previously seen frame from either the frame buffer or from the drive that stores the compressed representation of the previously seen frame. That is, at first the video sequence on the display is a live video sequence obtained from video frames stored in the frame buffer. No time-shifting has been performed. When displaying, the frame buffer outputs the previously seen frame repeatedly. This previously seen frame is of a high quality since it is generated from the processor unit. As such, the present embodiment sends the previously seen frame from the frame buffer for display.

Also, at 640, the present embodiment switches to the display of the previously seen frame to the compressed/decompressed representation of the previously seen frame, when the compressed/decompressed previously seen frame becomes available. As such, the present embodiment then sends the previously seen frame from the compression path for display. The quality of the previously seen frame from the compression path is of a lower quality than the digital input video signal since compression and decompression, and other processing, have been performed. However, the quality is higher than that of conventional techniques because the present embodiment utilizes less steps for storing the recorded video.

Simultaneously, at 650, the present embodiment also sends the digital input video signal for display in a window. That is, a window is overlaid on top of the displayed content showing the previously seen frame. The window shows the live content as generated by the processor unit (e.g., VPU, GPU, or CPU). The content shown in the window may be direct from the processor unit, or accessed by the frame buffer in embodiments of the present invention.

At 660, the present embodiment receives an instruction to resume live play of the digital input video signal that is uncompressed, or correspondingly, the processed digital input video signal. As such, at 670, the present embodiment expands the size of the window for display. In another embodiment, the expansion is achieved gracefully with a smooth transition from a small window to one that covers the entire display. That is, the window is expanded gradually such that the scale of the window is expanded gradually.

In addition, one embodiment is capable of scaling down equivalently the time-shifted frame to a window. As such, the picture-in-picture (PIP) of the live feed is always on, in one embodiment.

FIGS. 7A-7E illustrate displayed video frames when returning back to live video or bypass mode from a previously seen (e.g., paused), time-shifted video frame, in accordance with embodiments of the present invention. The displayed video frames in FIGS. 7A-7E are displayed in sequence and correspond to the displayed video sequence 500D of FIG. 5D. As such, the live video transitions from a small window, implemented as a PIP, to a full screen. In embodiments of the present invention, this is accomplished through the 3D pipeline or pixel shaders of the processor unit (e.g., VPU, GPU, etc.).

Various embodiments of the present invention are well suited to providing a PIP window of the previously seen frame and the live feed in various implementations. That is, the PIP windows may be situated side-by-side, presented with a smaller window within a larger window, etc. In addition, the transitioning from one window to another window can be implemented through various techniques (e.g., enlarging one window while simultaneously shrinking the other window, etc.). In each of these implementations, the VPU, GPU, or CPU is able to simultaneously generate both the expanding and the shrinking PIP windows to provide for graceful transitioning of the PIP windows.

Figure 7A:
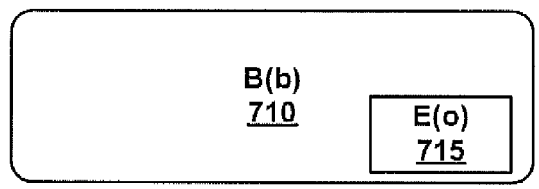
FIGS. 7A-7E are displayed video frames while returning back to live video from a paused, time-shifted video frame, in accordance with embodiments of the present invention.

As shown in FIG. 7A, the video frame B(b) is presented in display 710 of screen 700A. The video frame B(b) is obtained from the frame buffer and is of a high quality. For example, the video frame B(b) displayed corresponds to time t-5 in FIG. 5D of video sequence 500D. In addition, the present embodiment also generates a window 715 that shows the live content, video frame E(o), as generated by the processor unit.

Figure 7B:
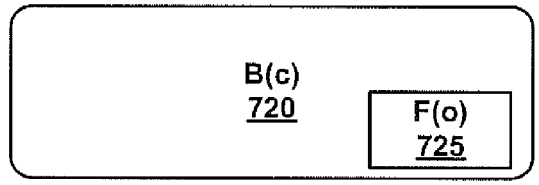

As shown in FIG. 7B, the video frame B(c) is presented in display 720 on screen 700B. The video frame B(c) is obtained from the compression path is of a lower quality than the video frame B(b). For example, the video frame B(c) displayed corresponds to time t-6 in video sequence 500D. In addition, the present embodiment also generates a window 725 that shows the live content, video frame F(o), as generated by the VPU.

Figure 7C:
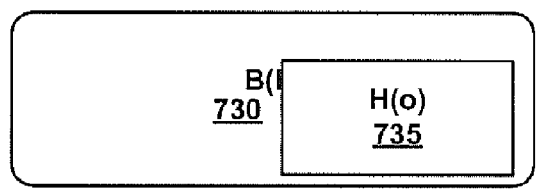

As shown in FIG. 7C, the video frame B(c) is still present in display 730 on screen 700C. In addition, the present embodiment also generates a window 735 that shows live content, video frame H(o) at a later moment in time. That is, numerous live video frames have been shown in the window between the video frame F(o) shown in window 725 and the video frame H(o) shown in window 735 of FIG. 7C.

Additionally, in FIG. 7C, an instruction has been received to return back to live video. As such, the present embodiment gradually expands the window size. As shown in FIG. 7C, the window 735 is shown larger than the previously shown windows (e.g., window 725).

Figure 7D:
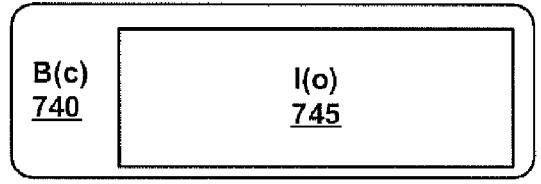

As shown in FIG. 7D, the video frame B(c) is still present in display 740 of screen 700D. However, the size of the window 745 showing live content I(o) is shown larger than the previously displayed window 735. That is, the window size is gradually and gracefully expanding.

In another embodiment, the graceful expansion is accomplished by displaying uncompressed live frames from the frame buffer so that recorded frames only have to catch up to, or match, the buffered live frames.

Figure 7E:
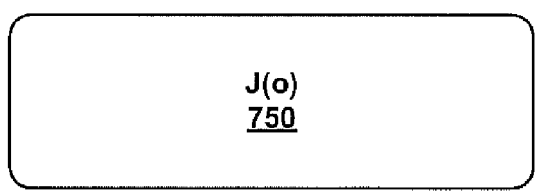

As shown in FIG. 7E, the video frame J(o) is displayed on the screen 750. That is, the window showing live content is larger than the previously displayed window 745, and fully takes up the screen 750.

Accordingly, the present invention provides, in various embodiments, a method and system for time-shifting video in a personal video recorder through a processor unit (e.g., VPU, GPU, etc). The present invention provides for reduced latency when pausing video. Additionally, embodiments of the present invention provide for higher quality video when time-shifting due to less processing. Also, embodiments of the present invention provide for a graceful transition when switching between paused video and returning back to live video, or bypassed video.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A method for time-shifting video, comprising:
   receiving a digital input video signal;
   providing a live feed of said digital input video signal as a digital output video signal for display;
   in parallel with providing said live feed, storing uncompressed video frames of said digital input video signal in a first storage medium;
   in parallel with providing said live fee, recording compressed said digital input video signal in a second storage medium;
   receiving an instruction to display said digital output video signal at a previously seen frame;
   accessing said previously seen frame from said video frames that are stored uncompressed, in response to receiving said instruction;
   switching from said live feed to repeatedly providing said previously seen frame from said video frames that are stored uncompressed, for display in response to receiving said instruction;
   accessing said previously seen frame that was recorded compressed, in response to receiving said instruction; and
   switching from said previously seen frame from said video frames that are stored uncompressed to providing said previously seen frame that was recorded compressed, for display in response to receiving said instruction.

2. The method of claim 1, further comprising:
   receiving an analog input video signal that is live; and
   converting said analog input video signal into said digital input video signal.

3. The method of claim 1, wherein said receiving an instruction to display said digital input video signal comprises:
   receiving said instruction to pause said live feed at a live, paused frame.

4. The method of claim 1, wherein said receiving an instruction to display said digital output video signal comprises:
   receiving said instruction to rewind said live feed to said previously seen frame.

5. The method of claim 1, wherein said receiving an instruction to display said digital output video signal comprises:
   receiving said instruction to skip to said previously seen frame.

6. The method of claim 1, further comprising:
   receiving a second instruction to resume said live feed of said digital input video signal;
   accessing said live feed, in response to receiving said second instruction; and
   providing said live feed as said digital output video signal for display, in response to receiving said second instruction.

7. The method of claim 1, further comprising:
   sending said digital output video signal for display in a window showing live content while said previously seen frame is displayed.

8. The method of claim 7, further comprising:
   receiving a second instruction to resume live play of said digital input video signal; and
   gradually expanding a size of said window for display, in response to receiving said second instruction.

9. The method of claim 1, further comprising:
   receiving a second instruction to resume play of said digital input video signal;
   accessing subsequent frames from said previously seen frame of said digital input video signal that was recorded, in response to receiving said second instruction; and
   providing said subsequent frames for display, in response to receiving said second instruction.

10. A personal video recorder for time-shifting video, comprising:
    a frame buffer for storing uncompressed frames of a digital input video signal;
    a compression engine for compressing said digital input video signal;
    a memory for recording said compressed digital input video signal;
    a decompression engine for decompressing a previously seen frame of said digital input video signal recorded by said memory in response to receiving an instruction to display said previously seen frame; and
    a video selector for providing a live feed of said digital input video signal as a digital output video signal for display, for switching to said previously seen frame stored uncompressed by said frame buffer in response to receiving said instruction to display said previously seen frame, and for switching between said previously seen frame from said frame buffer to said previously seen frame decompressed by said decompression engine when available in response to receiving said instruction to display said previously send frame.

11. The system of claim 10, further comprising:
    a video processor unit (VPU) including said compression engine and said video selector.

12. The system of claim 10, further comprising:
    a central processing unit including said compression engine.

13. The system of claim 10,
    wherein said memory comprises a hard drive for recording said compressed digital input video signal.

14. The system of claim 10, further comprising:
    a decoder for generating said digital input video signal from an analog input video signal.

15. The system of claim 11,
    wherein said processor unit comprises further includes said compression engine.

16. The system of claim 10, further comprising:
    a central processing unit including said decompression engine.

17. The system of claim 11, wherein said video processor unit comprises a graphics processing unit (GPU).

18. A computer system comprising:
    a processor for processing information; and
    a computer readable memory coupled to said processor and containing program instructions that, when executed cause said processor to implement a method for time-shifting video, comprising:
    receiving a digital input video signal;
    providing a live feed of said digital input video signal as a digital output video signal for display;
    in parallel with providing said live feed, storing uncompressed video frames of said digital input video signal in a frame buffer;
    in parallel with providing said live feed, recording compressed video frames of said digital input video signal in a hard drive;

receiving an instruction to display said digital output video signal at a previously seen frame;

accessing said previously seen frame from said video frames stored in said frame buffer, in response to receiving said instruction;

switching from said live feed to providing said previously seen frame from said video frames stored in said frame buffer, for display in response to receiving said instruction;

accessing said previously seen frame from said video frames recorded in said hard drive, in response to receiving said instruction; and switching from said previously seen frame from said video frames stored in said frame buffer to said previously seen frame from said video frames recorded in said hard drive after said previously seen frame is available from said hard drive, for display in response to receiving said instruction.

19. The computer system of claim 18, wherein said receiving an instruction to display said digital input video signal comprises additional instructions, wherein said additional instructions further comprise:

receiving said instruction to pause said live feed at a live, paused frame.

* * * * *